(12) United States Patent
Kato et al.

(10) Patent No.: US 12,234,623 B2
(45) Date of Patent: Feb. 25, 2025

(54) TILT STRUCTURE FOR CONSOLE

(71) Applicant: STARTING INDUSTRIAL CO., LTD., Tokyo (JP)

(72) Inventors: Hiroki Kato, Tokyo (JP); Ami Ishimizu, Tokyo (JP)

(73) Assignee: STARTING INDUSTRIAL CO., LTD., Tokyo (JP)

( * ) Notice: Subject to any disclaimer, the term of this patent is extended or adjusted under 35 U.S.C. 154(b) by 242 days.

(21) Appl. No.: 17/773,936

(22) PCT Filed: Dec. 2, 2020

(86) PCT No.: PCT/JP2020/044872
§ 371 (c)(1),
(2) Date: May 3, 2022

(87) PCT Pub. No.: WO2021/131557
PCT Pub. Date: Jul. 1, 2021

(65) Prior Publication Data
US 2022/0364325 A1    Nov. 17, 2022

(30) Foreign Application Priority Data

Dec. 26, 2019 (JP) ................. 2019-236073

(51) Int. Cl.
*G06F 7/70* (2006.01)
*E02F 9/16* (2006.01)
*E02F 9/20* (2006.01)

(52) U.S. Cl.
CPC ............ *E02F 9/2004* (2013.01); *E02F 9/166* (2013.01)

(58) Field of Classification Search
CPC ................. E02F 9/2004; E02F 9/166
See application file for complete search history.

(56) References Cited

U.S. PATENT DOCUMENTS

| 2004/0176218 A1* | 9/2004 | Fan | ............. A63B 22/0605 482/57 |
| 2018/0282971 A1* | 10/2018 | Yuan | ............. G05G 5/005 |

FOREIGN PATENT DOCUMENTS

| CN | 207053305 U | 2/2018 |
| JP | H07-19058 U | 4/1995 |
| JP | 2005-146678 A | 6/2005 |
| JP | 2005248580 A * | 9/2005 |
| JP | 2010127054 A * | 6/2010 |

(Continued)

OTHER PUBLICATIONS

Mar. 9, 2021 International Search Report issued in International Patent Application No. PCT/JP2020/044872.

(Continued)

*Primary Examiner* — Adam M Alharbi
(74) *Attorney, Agent, or Firm* — Oliff PLC

(57) ABSTRACT

A tilt structure to be provided allows the tilt of a console to be changed through simple motion and has a simple configuration. A control member 30 is coupled to a second frame 25 at a first coupling position P1 and is coupled to a first frame 20 at a second coupling position P2 provided below the first coupling position P1. Controlling the control member 30 makes the height of the first coupling position P1 adjustable. The tilt of the second frame 25 is changed in response to the height of the first coupling position P1.

3 Claims, 8 Drawing Sheets

(56) References Cited

FOREIGN PATENT DOCUMENTS

KR  10-0826628 B1  5/2008

OTHER PUBLICATIONS

Mar. 9, 2021 Written Opinion issued in International Patent Application No. PCT/JP2020/044872.
Aug. 28, 2024 Office Action issued in Chinese Patent Application No. 202080089739.8.

* cited by examiner (a)

(b)

(a)

(b)

(a)

(b)

(a)

(b)

TILT STRUCTURE FOR CONSOLE

TECHNICAL FIELD

This invention relates to a tilt structure to change the tilt of a console arranged at a lateral part of a seat.

BACKGROUND ART

A construction machine such as a hydraulic shovel has a driver seat provided in a cabin, and a platform for getting on and off the driver seat is provided on either a right side or a left side. A console is arranged at a lateral part of the seat and the console includes an operation lever for steering provided in a protruding position. In some cases, a tilt structure to change the tilt of the console is provided for facilitating getting on and off the seat or adjusting the height of the operation lever at the time of seating in the seat.

For example, Patent Literature 1 discloses a configuration in which two locking pins extending one above the other and parallel to each other are placed at a tilt bracket, the upper locking pin is fixed to a second frame, and the lower locking pin is locked in a tooth groove part of a first frame. This configuration allows the tilt of the second frame to be changed by changing a position at which the lower locking pin is engaged with the tooth groove part of the first frame.

PRIOR ART LITERATURE

Patent Literature

Patent Literature 1: Japanese Utility Model Application Publication No. Hei 7-19058

SUMMARY OF INVENTION

Problem to be Solved by Invention

However, the above-described configuration of Patent Literature 1 has a need to rotate the tilt bracket arranged inside a console for changing the tilt of the second frame. In response to this, to allow the tilt of the console to be changed from outside, a mechanism for rotating the tilt bracket is required to cause a problem of complicating the configuration.

Thus, the present invention is intended to provide a tilt structure allowing the tilt of a console to be changed through simple motion and having a simple configuration.

Means of Solving Problem

To solve the above-described problem, the present invention is intended for a tilt structure to change the tilt of a console arranged at a lateral part of a seat, comprising: a first frame arranged at the lateral part of the seat; a second frame attached to an upper portion of the first frame in such a manner as to be swingable upward and downward; and a control member arranged between the first frame and the second frame, wherein the control member is coupled to the second frame at a first coupling position and is coupled to the first frame at a second coupling position provided below the first coupling position, controlling the control member makes the height of the first coupling position adjustable, and the tilt of the second frame is changed in response to the height of the first coupling position.

Advantageous Effects of Invention

According to the present invention described above, controlling the control member makes the height of the first coupling position adjustable, and the tilt of the second frame is changed in response to the height of the first coupling position. Thus, the tilt of the console can be changed through simple motion while the configuration can be simplified.

EMBODIMENTS FOR CARRYING OUT INVENTION

First Embodiment

A first embodiment of the present invention will be described by referring to FIGS. 1 to 4. In the following description, a horizontal frontward direction determined when an operator is seated in a seat 10 is called a "forward" direction, and a direction opposite the "forward" direction is called a "backward" direction. Furthermore, with the operator seated in the seat 10 and facing frontward, a left side viewed from the operator is called a "leftward" direction and a right side viewed from the operator is called a "rightward" direction.

Figure 1:
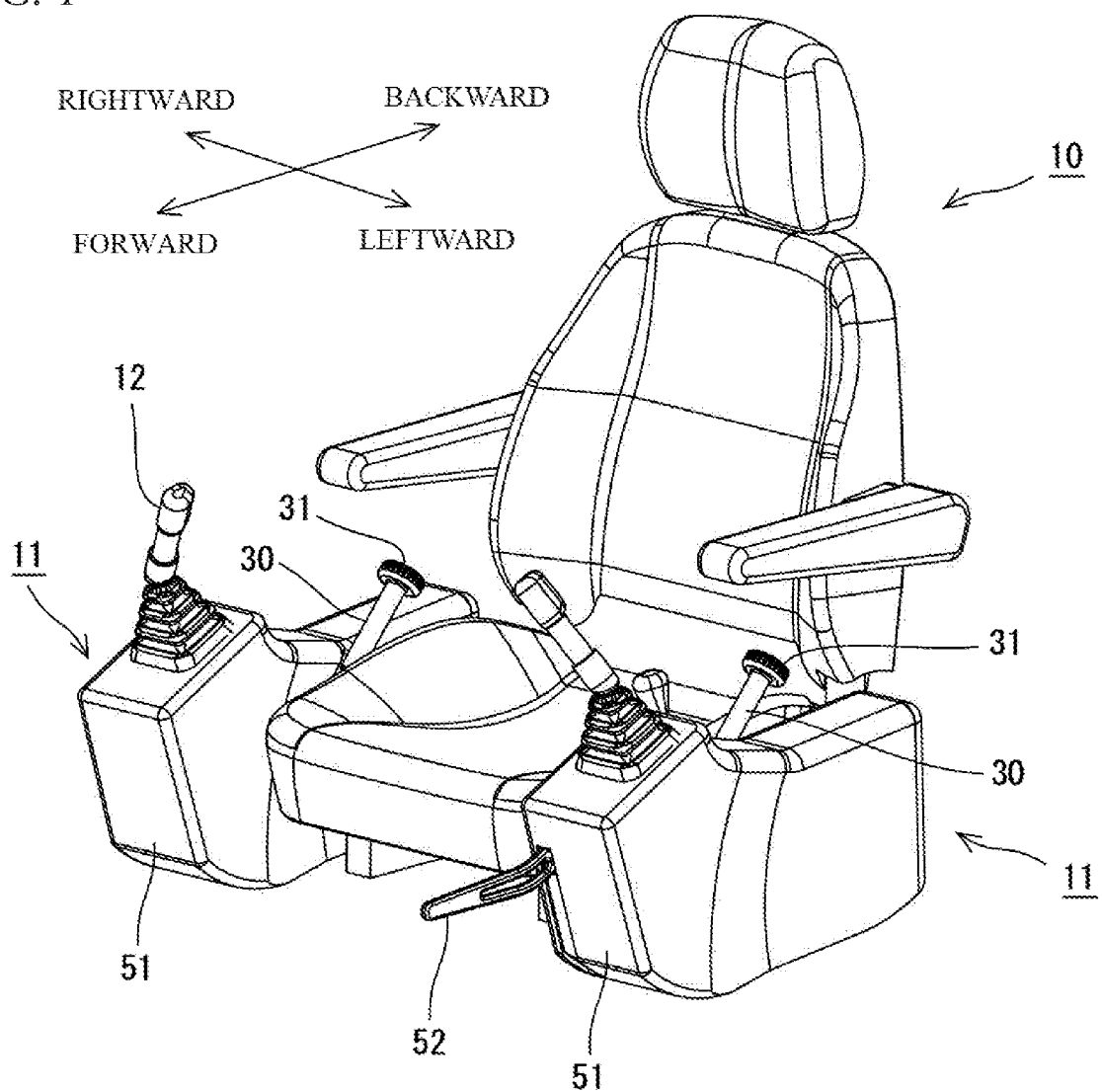
FIG. 1 is a perspective view showing a seat and a console according to a first embodiment.

A console 11 according to the present embodiment is used in a construction machine such as a hydraulic shovel. In such a construction machine, the seat 10 for an operator is provided in a cabin and the console 11 is arranged at each of both lateral parts of the seat 10. As shown in FIG. 1, the console 11 includes an operation lever 12 for steering provided in a protruding position. An operator controls the operation levers 12 with both hands to do steering such as rotation to the right and left or moving an arm.

While not particularly illustrated in the drawings, a platform for getting on and off the seat 10 is provided further at the back of the console 11 on one side as viewed from the seat 10 (in FIG. 1, the left console 11). Thus, passing in front of the console 11 is required for seating in the seat 10, and an area in front of the console 11 is a platform pathway to the seat 10. This console 11 on one side is provided with a gate lever 52 for interfering with getting on and off during steering. The gate lever 52 can be used for blocking the platform pathway during operation, and for opening the platform pathway during getting on and off by being flipped up.

Figure 2:
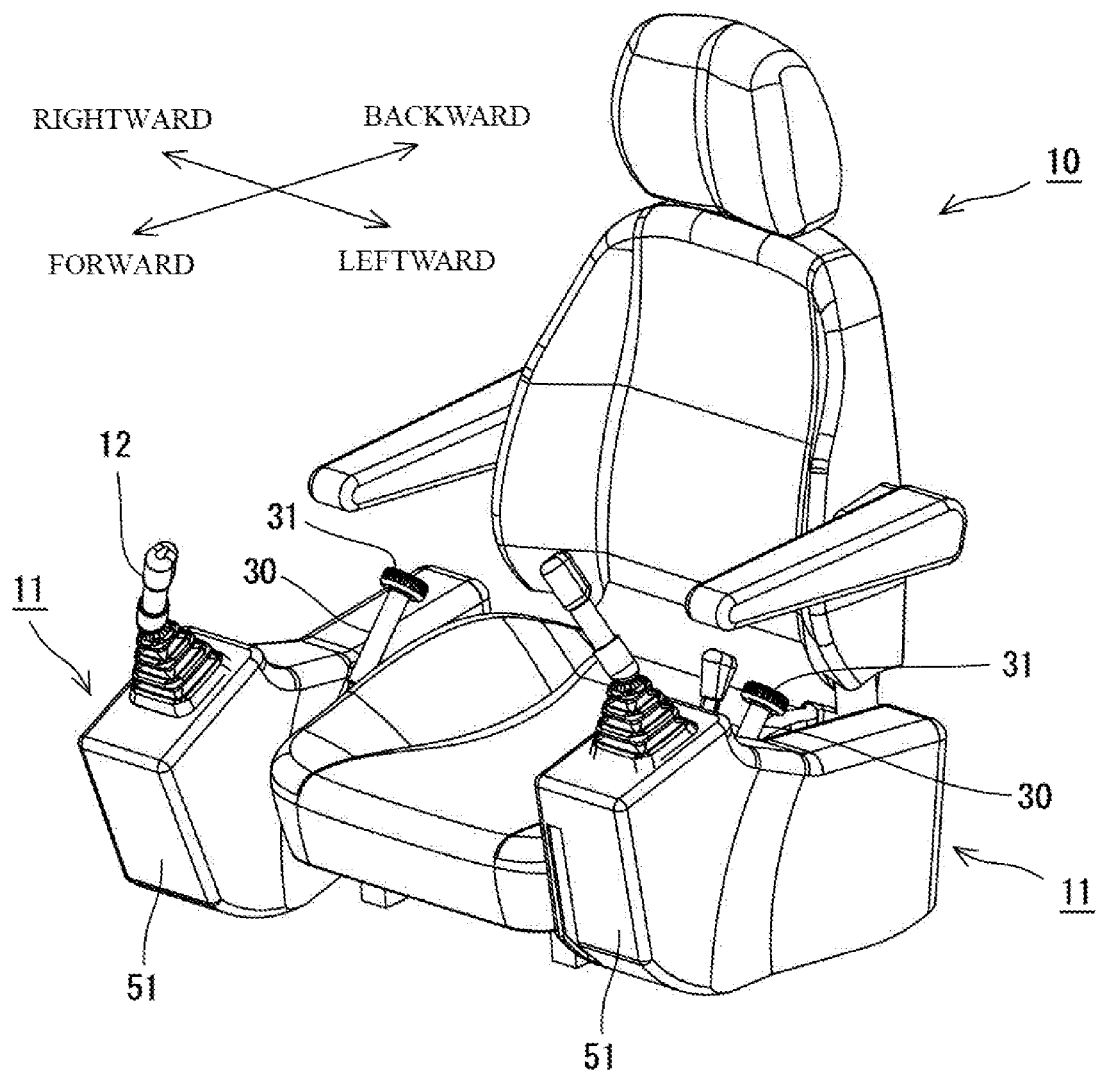
FIG. 2 is a perspective view showing the seat and the console while the tilt of the console is changed according to the first embodiment.

The console 11 according to the present embodiment includes a tilt structure to change the tilt of the console 11 for facilitating getting on and off the seat 10 or for adjusting the height of the operation lever 12 at the time of seating in the seat 10. For example, as shown in FIG. 2, the operation lever 12 can be moved to a higher position by changing the tilt of the console 11.

Figure 3:
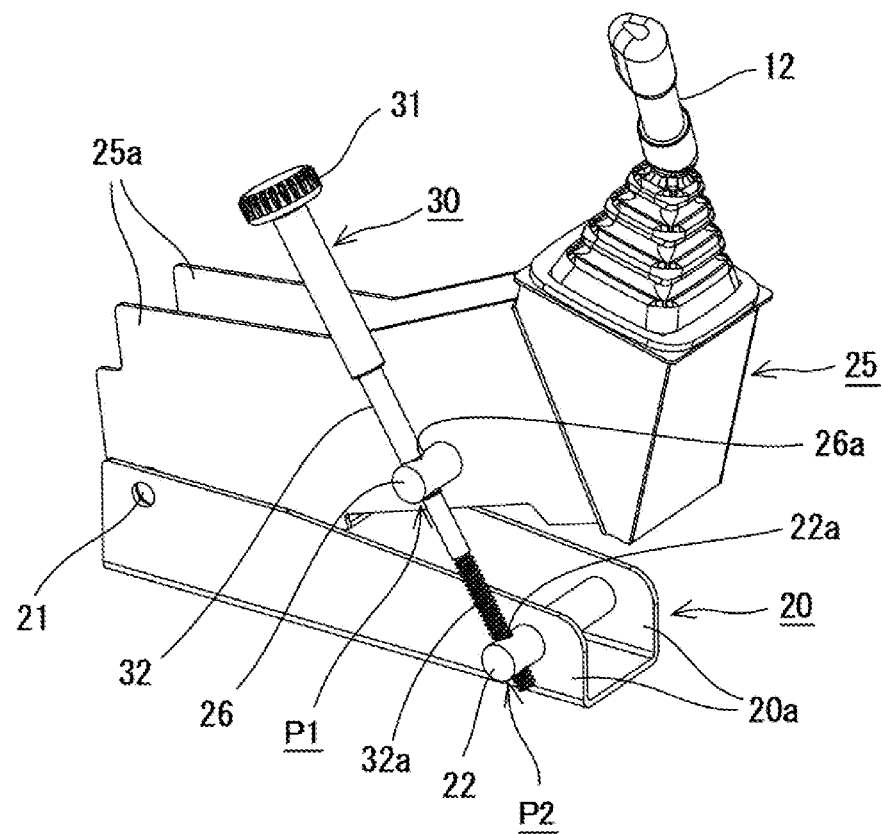
FIG. 3 is a view explaining the interior of the console according to the first embodiment.
Figure 4:
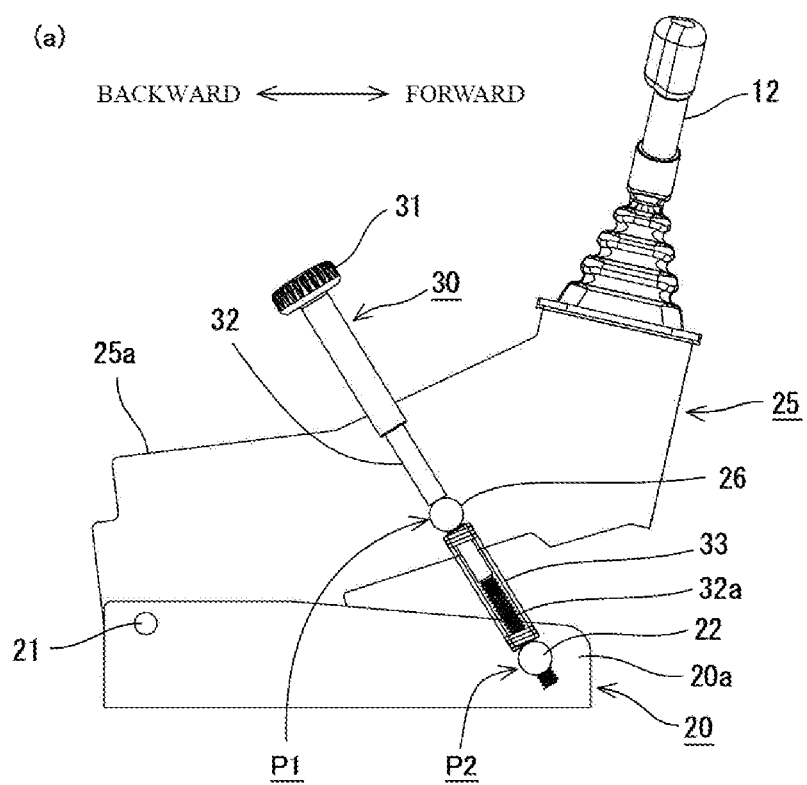
FIG. 4 is a view explaining motion of the console according to the first embodiment, and includes a side view (a) showing a state where a second frame is moved upward and a view (b) showing a state where the second frame is moved downward.
Figure 4:
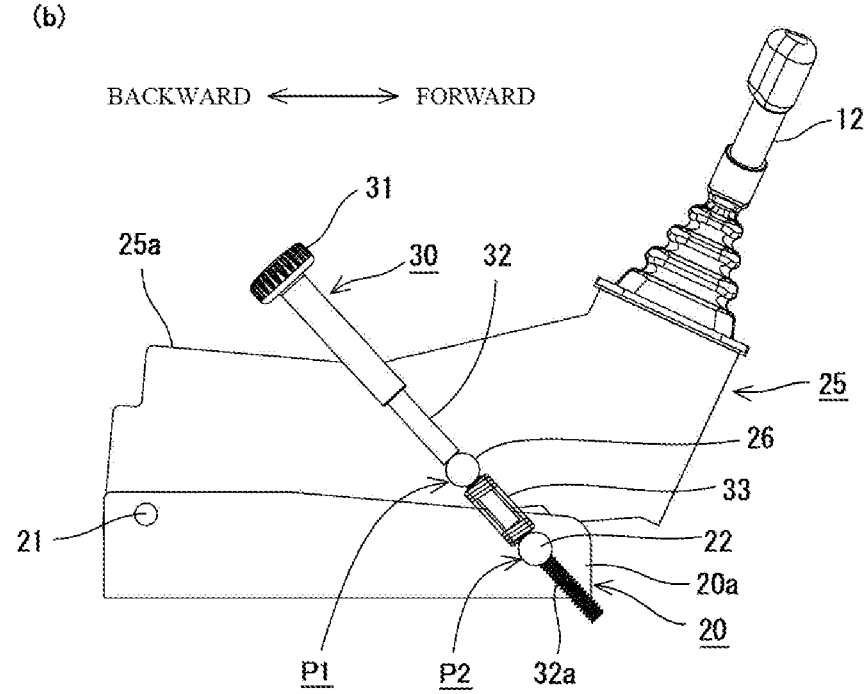

As shown in FIG. 3, the console 11 includes a first frame 20, a second frame 25, and a control member 30. As shown in FIG. 1, these members are accommodated in an interior covered with a frame cover 51 so as not to be exposed to the outside except a controllable part.

The first frame 20 is a frame fixed to a lateral part of the seat 10. The first frame 20 is arranged in such a manner as to face a floor surface. The first frame 20 according to the present embodiment includes side plate parts 20a in a pair formed of metallic plates. The side plate parts 20a in a pair support a circular columnar second rotation support 22 rotatably.

The second rotation support 22 is arranged adjacent to the front end of the first frame 20 and is bridged between the side plate parts 20a in a pair in such a manner as to place a rotary axis horizontally. The second rotation support 22 is provided with a through hole 22a penetrating the second rotation support 22 in a direction orthogonal to the rotary axis of the second rotation support 22. A shaft part 32 of the control member 30 described later is passed through the through hole 22a. Thus, in response to axis rotation of the second rotation support 22 supported by the first frame 20, the tilt of the through hole 22a is changed to tilt the control member 30.

The through hole 22a has an inner peripheral surface provided with a female thread threadedly engaged with a thread part 32a of the shaft part 32 of the control member 30 described later. In this way, the control member 30 is configured in such a manner that, in response to axis rotation of the control member 30, the control member 30 is caused to advance and retreat upward and downward relative to the second rotation support 22 by screw action between the female thread of the through hole 22a and the thread part 32a of the shaft part 32 of the control member 30.

The second frame 25 is a frame attached to an upper portion of the first frame 20 and arranged in such a manner as to be swingable upward and downward relative to the first frame 20. The second frame 25 according to the present embodiment includes side plate parts 25a in a pair formed of metallic plates. The side plate part 25a of the second frame 25 has a lower end portion arranged in such a manner as to overlap an upper end portion of the side plate part 20a of the first frame 20. A swinging shaft 21 for connecting the side plate parts 20a and 25a while allowing swinging motions of the side plate parts 20a and 25a is provided at a position where the side plate parts 20a and 25a overlap each other at their back portions.

The side plate parts 25a in a pair of the second frame 25 support a circular columnar first rotation support 26 rotatably. The first rotation support 26 is arranged above the second rotation support 22 and is bridged between the side plate parts 25a in a pair in such a manner as to place a rotary axis horizontally. The first rotation support 26 is provided with a through hole 26a penetrating the first rotation support 26 in a direction orthogonal to the rotary axis of the first rotation support 26. The shaft part 32 of the control member 30 described later is passed through the through hole 26a. Thus, in response to axis rotation of the first rotation support 26 supported by the second frame 25, the tilt of the through hole 26a is changed to tilt the control member 30.

The control member 30 is a rod-like member to be controlled by an operator in changing the tilt of the console 11 and is arranged between the first frame 20 and the second frame 25. The control member 30 according to the present embodiment includes a grip part 31 for causing rotary motion of the control member 30, and the shaft part 32 coupled to a lower portion of the grip part 31.

The grip part 31 is provided at the upper end of the control member 30 and is exposed to the outside of the frame cover 51 for allowing control by an operator as shown in FIG. 1, etc. The operator can change the tilt of the second frame 25 by gripping and axially rotating the grip part 31.

The shaft part 32 is a link connecting the first frame 20 and the second frame 25 to each other. The shaft part 32 is coupled to the second frame 25 at a first coupling position P1 and is coupled to the first frame 20 at a second coupling position P2 provided below the first coupling position P1.

The first coupling position P1 according to the present embodiment is configured using the first rotation support 26. The first rotation support 26 supports the shaft part 32 of the control member 30 axially rotatably. The control member 30 is held at the first rotation support 26 in such a manner as to be unmovable in the axis direction.

The second coupling position P2 according to the present embodiment is configured using the second rotation support 22. The second rotation support 22 supports the shaft part 32 of the control member 30 axially rotatably while movably in the axis direction. Specifically, by the above-described screw action generated in response to axis rotation of the control member 30, the control member 30 is configured to advance and retreat at the second coupling position P2.

As already described above, the first rotation support 26 and the second rotation support 22 are rotatable relative to the second frame 25 and the first frame 20. In response to rotations of the first rotation support 26 and the second rotation support 22, the control member 30 becomes capable of tilting backward and forward.

In the tilt structure according to the present embodiment having the above-described configuration, causing the control member 40 to rotate makes it possible to adjust an interval between the first coupling position P1 and the second coupling position P2. Increasing the interval between the first coupling position P1 and the second coupling position P2 increases the height of the first coupling position P1. Reducing the interval between the first coupling position P1 and the second coupling position P2 reduces the height of the first coupling position P1. Changing the height of the first coupling position P1 necessarily changes the height of the second frame 25, so that the tilt of the second frame 25 is changed in response to the height of the first coupling position P1.

More specifically, as shown in FIG. 4(a), axially rotating the control member 30 in a predetermined direction (an anticlockwise direction, for example) lifts the control member 30 upward at the second coupling position P2. By doing so, the interval between the first coupling position P1 and the second coupling position P2 is increased to lift the second frame 25 upward.

As shown in FIG. 4(b), axially rotating the control member 30 in an opposite direction (a clockwise direction, for example) moves the control member 30 downward at the second coupling position P2. By doing so, the interval between the first coupling position P1 and the second coupling position P2 is reduced to move the second frame 25 downward.

To assist in such rotary motion of the control member 30, a biasing member may be provided to bias the second frame 25 upward. For example, in the present embodiment, a compression spring 33 is fitted to an outer periphery of the shaft part 32 of the control member 30 to apply bias in a direction of moving the first rotation support 26 and the second rotation support 22 away from each other. Providing such biasing means (compression spring 33) makes it possible to reduce control load for causing the control member 30 to rotate (in particular, control load for lifting the second frame 25).

As described above, according to the present embodiment, controlling the control member 30 makes the interval between the first coupling position P1 and the second coupling position P2 adjustable, and the tilt of the second frame 25 is changed in response to the height of the first coupling position P1. Thus, the tilt of the console 11 can be changed through simple motion and the configuration can be simplified.

In the configuration described in the present embodiment, the control member 30 is configured to advance and retreat at the second coupling position P2 (second rotation support 22). However, this is not the only configuration but the control member 30 may be configured to advance and retreat at the first coupling position P1 (first rotation support 26).

Figure 5:
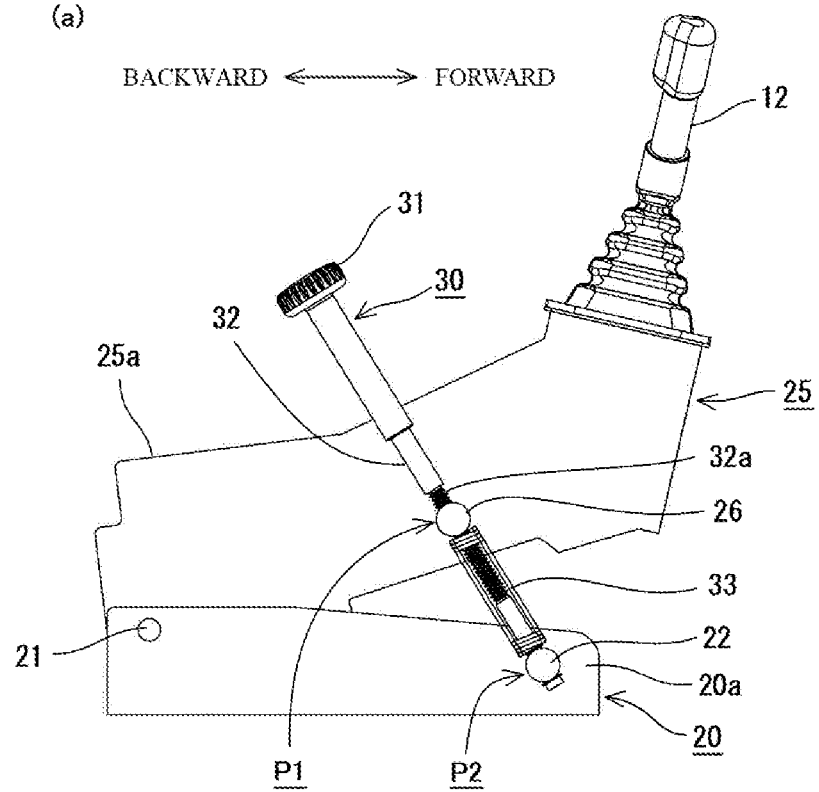
FIG. 5 is a view explaining motion of a console according to a modification of the first embodiment, and includes a side view (a) showing a state where a second frame is moved upward and a view (b) showing a state where the second frame is moved downward.
Figure 5:
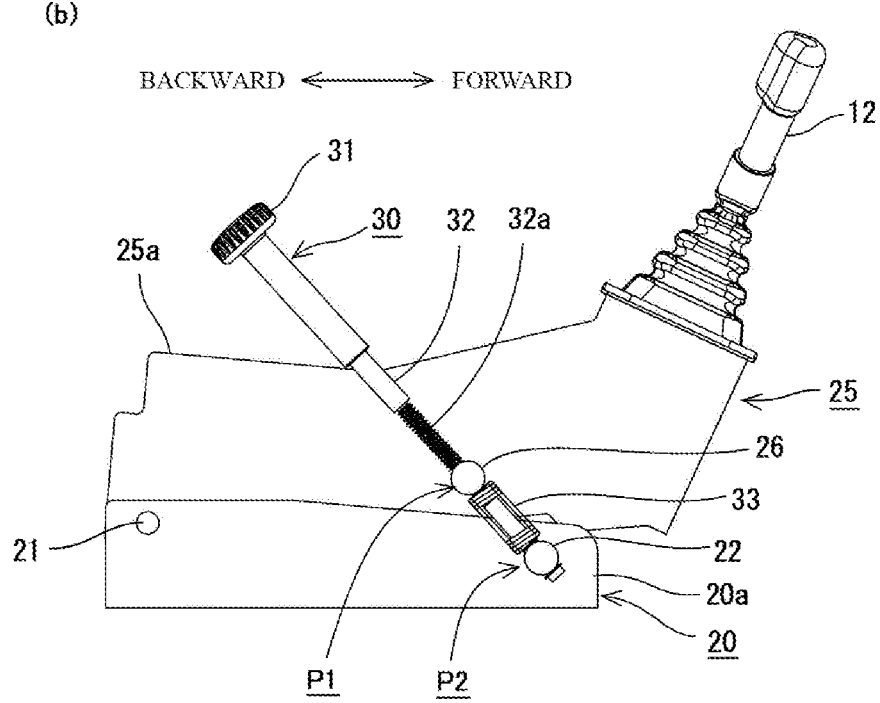

Specifically, as shown in FIG. 5, the first rotation support 26 may support the shaft part 32 of the control member 30 axially rotatably while movably in the axis direction, and the control member 30 may be configured to advance and retreat at the first coupling position P1 by screw action generated in response to axis rotation of the control member 30. In this case, the control member 30 is held at the second coupling position P2 (second rotation support 22) in such a manner as to be immovable in the axis direction.

In this configuration, as shown in FIG. 5(a), axially rotating the control member 30 in a predetermined direction lifts the first rotation support 26 (first coupling position P1) to allow the second frame 25 to be lifted upward.

As shown in FIG. 5(b), axially rotating the control member 30 in an opposite direction lowers the first rotation support 26 (first coupling position P1) to allow the second frame 25 to be moved downward.

Second Embodiment

Figure 7:
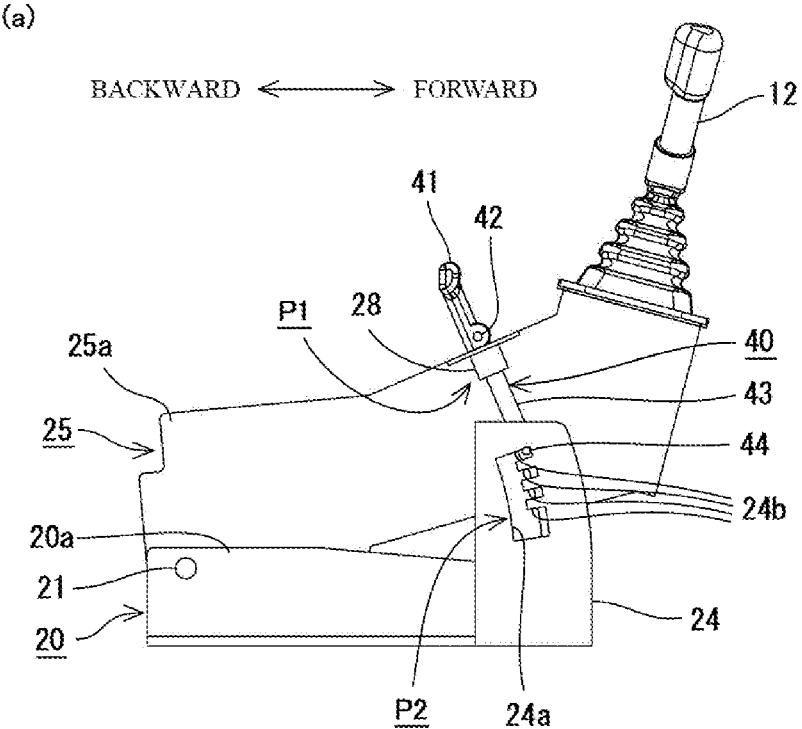
FIG. 7 is a view explaining motion of the console according to the second embodiment, and includes a view (a) showing a state where a grip part of the control member is raised and a view (b) showing a state where the control member is rotated.
Figure 7:
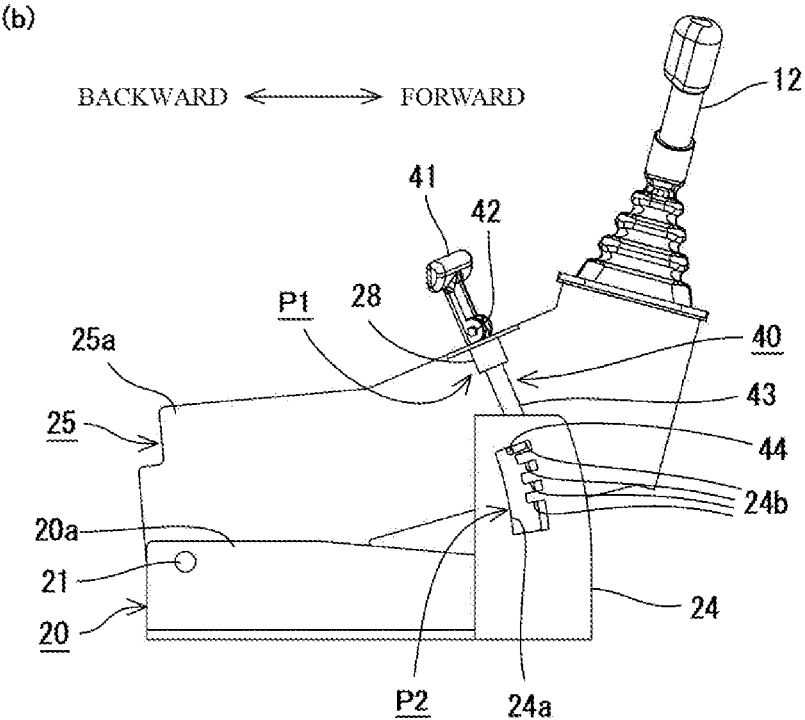
Figure 8:
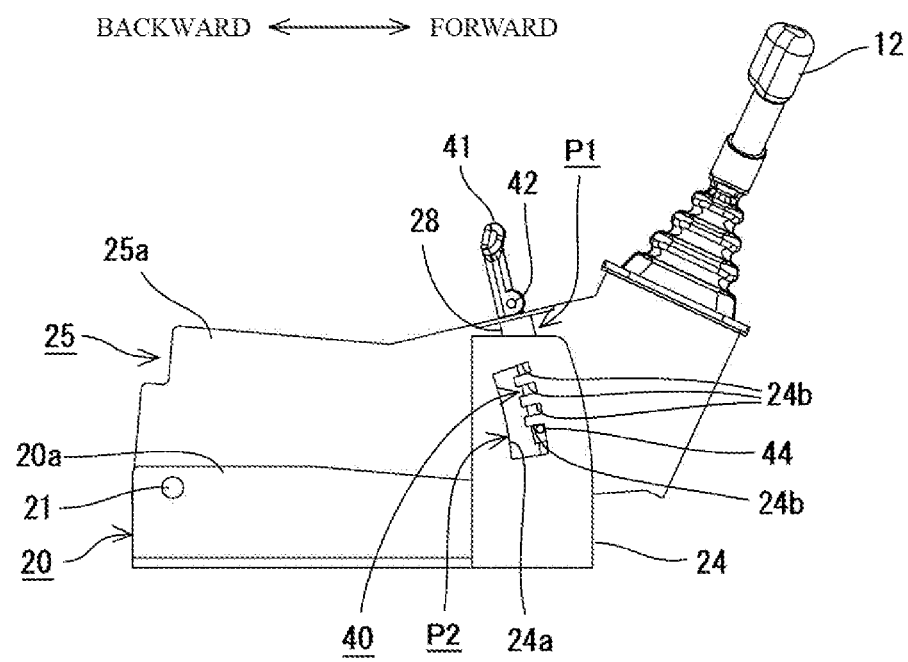
FIG. 8 is a view explaining motion of the console according to the second embodiment, and includes a view (a) showing a state where an engagement position of a pin of the control member is moved and a view (b) showing a state where the grip part of the control member is laid down.
Figure 8:
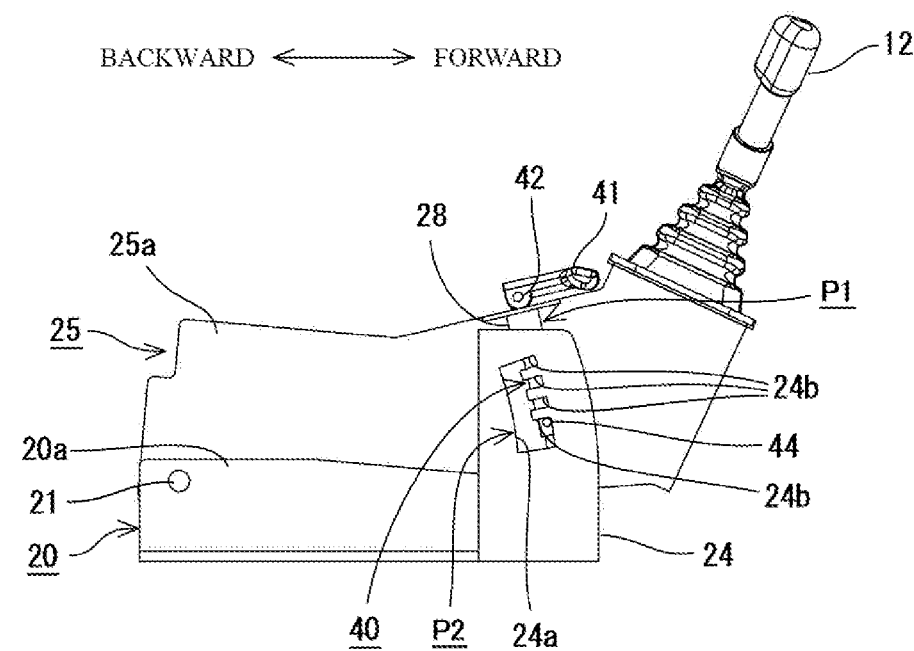

A second embodiment of the present invention will be described by referring to FIGS. 6 to 8. In the following description, only a difference from the above-described first embodiment will be explained while explanation of an overlap will be omitted.

Figure 6:
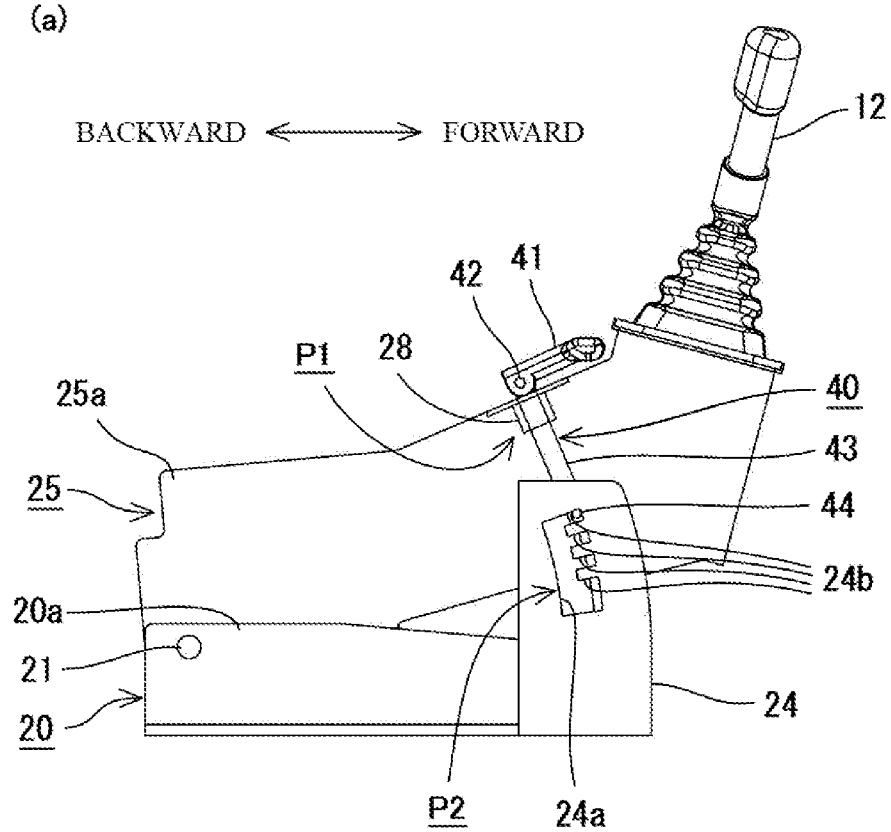
FIG. 6 includes a view (a) explaining the interior of a console and a perspective view (b) showing a control member according to a second embodiment.
Figure 6:
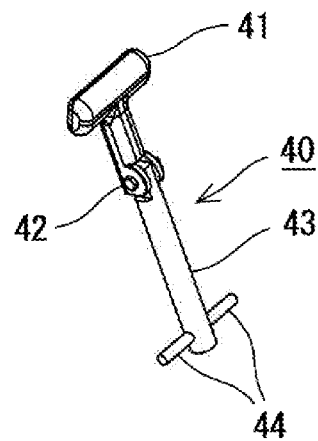

As shown in FIG. 6, a console 11 according to the present embodiment includes a first frame 20, a second frame 25, and a control member 40. These mechanisms are covered with a frame cover 51 so as not to be exposed to the outside except a controllable part.

The first frame 20 is a frame fixed to a lateral part of the seat 10. The first frame 20 is arranged in such a manner as to face a floor surface. The first frame 20 according to the present embodiment includes side plate parts 20a in a pair formed of metallic plates. The side plate part 20a includes a guide plate 24 for holding the control member 40 described later. In the present embodiment, each of the side plate parts 20a in a pair includes the guide plate 24 and the two guide plates 24 are arranged parallel to each other.

The guide plates 24 in a pair are each given an engagement groove 24a in which a pin 44 of the control member 40 described later can be accommodated. As shown in FIG. 6(a), the engagement groove 24a includes a plurality of engagement targets 24b for engagement of the pin 44 of the control member 40. The engagement target 24b is formed by jutting out a part of the engagement groove 24a so as to allow hook of the pin 44 on the engagement target 24b. After the pin 44 moves along the engagement groove 24a, the pin 44 gets into the engagement target 24b and is latched on this engagement target 24b, thereby allowing the pin 44 to be fixed to the engagement target 24b.

The engagement targets 24b described above are formed in a plurality of tiers defined one above the other, and the pin 44 is movable between these engagement targets 24b. Determining the engagement target 24b with which the pin 44 is to be engaged changes the height of the control member 40 (and that of the second frame 25 coupled to the control member 40).

The second frame 25 is a frame attached to an upper portion of the first frame 20 and arranged in such a manner as to be swingable upward and downward relative to the first frame 20. The second frame 25 according to the present embodiment includes a side plate part 25a formed of a metallic plate. The side plate part 25a of the second frame 25 has a lower end portion arranged in such a manner as to overlap an upper end portion of the side plate part 20a of the first frame 20. A swinging shaft 21 for connecting the side plate parts 20a and 25a while allowing swinging motions of the side plate parts 20a and 25a is provided at a position where the side plate parts 20a and 25a overlap each other at their back portions. In the present embodiment, a damper (not shown in the drawings) is arranged around the swinging shaft 21 to apply damping force to the swinging motions of the first frame 20 and the second frame 25. Thus, the second frame 25 is configured in such a manner that, even in a swingable state (an unlocked state described later), the second frame 25 does not swing steeply but is caused to swing gently.

The second frame 25 includes a rotation support 28 that supports the control member 40 described later axially rotatably. The rotation support 28 according to the present embodiment includes a cylindrical part allowing the control member 40 to pass therethrough, and the control member 40 is rotatably supported by this cylindrical part.

The control member 40 is a rod-like member to be controlled by an operator in changing the tilt of the console 11. As shown in FIG. 6(b), the control member 40 according to the present embodiment includes a grip part 41 for controlling the control member 40, and a shaft part 43 coupled to a lower portion of the grip part 41 through a rotary shaft 42.

The grip part 41 is provided at the upper end of the control member 40 and is exposed to the outside of the frame cover 51 for allowing control by an operator. In order to be folded in a non-used state, the grip part 41 according to the present embodiment is attached in a pivotable manner to the upper end of the shaft part 43. The grip part 41 is pivotable about the rotary shaft 42. When the grip part 41 is not to be used, the grip part 41 can be prevented from interfering with control by being laid down, as shown in FIG. 6(a). When the control member 40 is to be controlled, the grip part 41 is raised as shown in FIG. 7(a) to allow an operator to control the control member 40 by gripping the grip part 41.

The shaft part 43 is a rod-like part extending downward from the grip part 41. The shaft part 43 is coupled to the second frame 25 at a first coupling position P1 and is coupled to the first frame 20 at a second coupling position P2 provided below the first coupling position P1. As shown in FIG. 6(b), the pin 44 (engagement part) protruding in the horizontal direction (right-left direction) is fixed to the vicinity of the tip of the shaft part 43. The pin 44 becomes engageable with the engagement target 24b by getting into the above-described engagement groove 24a.

The first coupling position P1 according to the present embodiment is configured using the above-described rotation support 28. The rotation support 28 supports the shaft part 43 of the control member 40 axially rotatably. The control member 40 is held at the rotation support 28 in such a manner as to be unmovable in the axis direction.

The second coupling position P2 according to the present embodiment is configured using the above-described engagement groove 24a (a plurality of engagement targets 24b) and the pin 44. The pin 44 is engageable with one engagement target 24b selected from a plurality of the engagement targets 24b. Controlling the control member 40 makes the engagement target 24b of a plurality of the engagement targets 24b switchable with which the pin 44 is to be engaged. By determining the engagement target 24b of a plurality of the engagement targets 24b with which the pin 44 is to be engaged, the height of the first coupling position P1 (rotation support 28) is changed to change the tilt of the second frame 25.

An engagement position for the pin 44 can be changed by axially rotating the control member 40. Axially rotating the control member 40 makes it possible to switch between a locked state where the pin 44 is latched on any one of a plurality of engagement targets 24b and an unlocked state where the pin 44 is disengaged from the engagement target 24b. As the pin 44 is locked in the locked state, the second frame 25 is prevented from swinging relative to the first frame 20. On the other hand, in the unlocked state, the pin 44 is movable along the engagement groove 24a. Moving the pin 44 along the engagement groove 24a in this way allows the second frame 25 to swing relative to the first frame 20, making it possible to change the tilt of the second frame 25.

More specifically, as shown in FIG. 7(a), the grip part 41 of the control member 40 is first raised to place the grip part 41 in a controllable state. Then, as shown in FIG. 7(b), the control member 40 is axially rotated in a predetermined direction (for example, a clockwise direction) to disengage the pin 44 from the engagement target 24b, thereby forming the unlocked state. In this state, the tilt of the second frame 25 can be changed by moving the second frame 25 upward and downward. After the second frame 25 is set at an arbitrary height, the control member 40 is axially rotated to a direction (for example, an anticlockwise direction) opposite the previous direction, as shown in FIG. 8(a). By doing so, the pin 44 gets into the engagement target 24b to form the locked state. Thus, the second frame 25 is fixed to set the height. Finally, as shown in FIG. 8(b), the grip part 41 of the control member 40 is laid down. By doing so, the grip part 41 does not become a hindrance to the control of the operation lever 12 and erroneous control of the grip part 41 is prevented.

In the present embodiment, as the second frame 25 is biased upward by the bumper, the pin 44 is engaged by being pressed against the upper edge of the engagement target 24b.

In the present embodiment, the engagement targets 24b are provided at both of the guide plates 24 in a pair, and directions of jutting out of the engagement targets 24b are reversed between the right and left guide plates 24. As shown in FIG. 6(a), etc., if the engagement target 24b is formed by jutting out a part of the engagement groove 24a forward at the right guide plate 24, for example, the engagement target 24b is formed by jutting out a part of the engagement groove 24a backward at the left guide plate 24. In this formation, the pin 44 is latched on the engagement targets 24b on both the right side and the left side to allow the pin 44 to be locked stably.

In the tilt structure according to the present embodiment having the above-described configuration, controlling the control member 40 makes the height of the first coupling position P1 (rotation support 28) adjustable. The tilt of the second frame 25 is changed in response to the height of the first coupling position P1.

Specifically, as shown in FIG. 6(a), engaging the pin 44 with the engagement target 24b at a rather high position by controlling the control member 40 moves the rotation support 28 and the engagement groove 24a away from each other. As a result, the height of the first coupling position P1 (rotation support 28) is increased to lift the second frame 25 upward.

As shown in FIG. 8(b), engaging the pin 44 with the engagement target 24b at a rather low position by controlling the control member 40 moves the rotation support 28 and the engagement groove 24a closer to each other. As a result, the height of the first coupling position P1 (rotation support 28) is reduced to move the second frame 25 downward.

As described above, according to the present embodiment, the tilt of the console 11 can be changed through simple motion and the configuration can be simplified.

As described above, according to the present embodiment, the tilt of the console 11 can be changed through simple motion and the configuration can be simplified.

REFERENCE SINGS LIST

10 Seat
11 Console
12 Operation lever
20 First frame
20a Side plate part
21 Swinging shaft
22 Second rotation support
22a Through hole
24 Guide plate
24a Engagement groove
24b Engagement target
25 Second frame
25a Side plate part
26 First rotation support
26a Through hole
28 Rotation support
30 Control member
31 Grip part
32 Shaft part
32a Thread part
33 Compression spring
40 Control member
41 Grip part
42 Rotary shaft
43 Shaft part
44 Pin (engagement part)
51 Frame cover
52 Gate lever
P1 First coupling position P2 Second coupling position

The invention claimed is:

1. A tilt structure to change the tilt of a console arranged at a lateral part of a seat, comprising:
   a first frame arranged at the lateral part of the seat;
   a second frame attached to an upper portion of the first frame in such a manner as to be pivotable upward and downward; and
   a control member arranged between the first frame and the second frame, wherein
   the control member is coupled to the second frame at a first coupling position and is coupled to the first frame at a second coupling position provided below the first coupling position,
   controlling the control member makes the height of the first coupling position adjustable, and
   the tilt of the second frame is changed in response to the height of the first coupling position, wherein
   the control member is supported axially rotatably at the first coupling position and the second coupling position,
   the control member is configured to advance and retreat at either the first coupling position or the second coupling position by screw action generated in response to rotation of the control member about a longitudinal axis of the control member, and to tilt relative to the first frame as the tilt of the second frame is changed,
   at each of the first coupling position and the second coupling position, the control member passes through a through hole, and a female thread is formed on an inner circumference of only one of the through holes, and
   the control member includes a male thread that engages with the female thread.

2. A tilt structure to change the tilt of a console arranged at a lateral part of a seat, comprising:
   a first frame arranged at the lateral part of the seat;
   a second frame attached to an upper portion of the first frame in such a manner as to be pivotable upward and downward; and
   a control member arranged between the first frame and the second frame, wherein
   the control member is coupled to the second frame at a first coupling position and is coupled to the first frame at a second coupling position provided below the first coupling position,
   controlling the control member makes the height of the first coupling position adjustable, and
   the tilt of the second frame is changed in response to the height of the first coupling position, wherein
   the first frame includes a plurality of engagement targets for engagement of the control member at the second coupling position,
   the control member includes an engagement part, and
   (i) rotation of the control member about a longitudinal axis of the control member in a first direction disengages the engagement part from one engagement target selected from the plurality of the engagement targets, and enables pivoting of the second frame relative to the first frame, and (ii) rotation of the control member about the longitudinal axis of the control member in a second direction opposite to the first direction engages the engagement part with another engagement target selected from the plurality of the engagement targets, and locks the second frame in position relative to the first frame.

3. The tilt structure according to claim 2, further comprising a grip part pivotably attached to an upper end of the control member, the grip part being pivotable between a raised state and a laid-down state.

* * * * *